W. F. WIDMAYER.
ROTARY-FLIES FOR PRINTING-PRESSES.

No. 194,022. Patented Aug. 7, 1877.

WITNESSES:

INVENTOR:

2 Sheets—Sheet 2.
W. F. WIDMAYER.
ROTARY-FLIES FOR PRINTING-PRESSES.
No. 194,022. Patented Aug. 7, 1877.
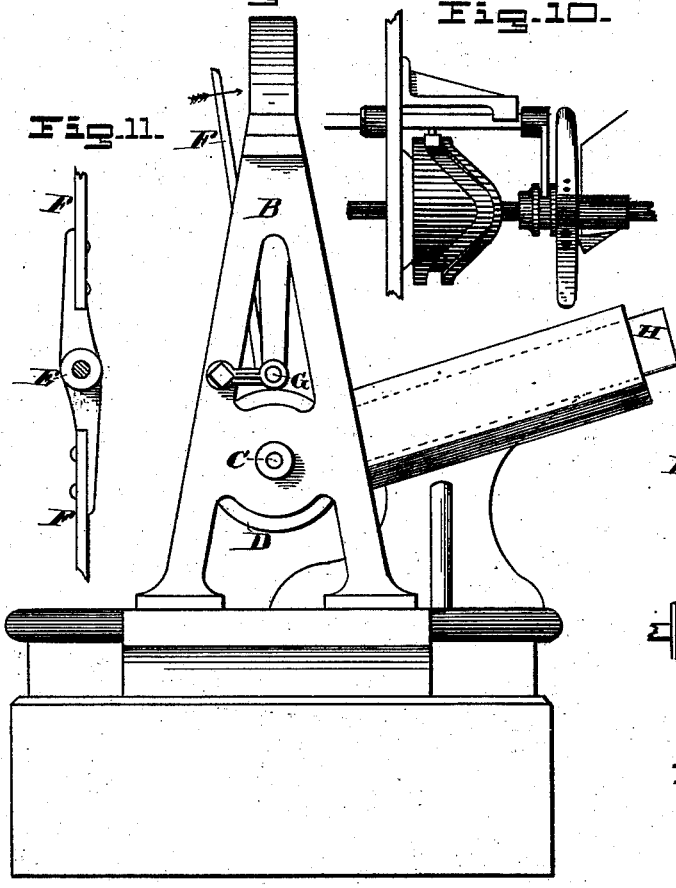
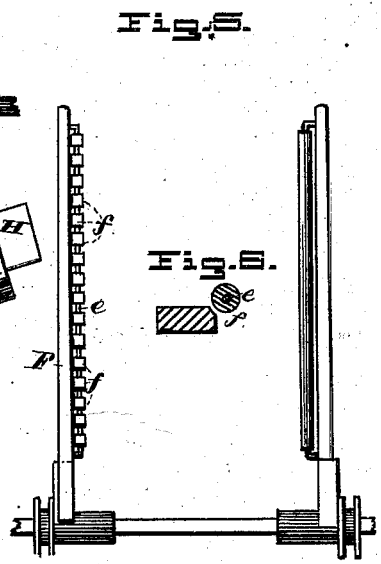
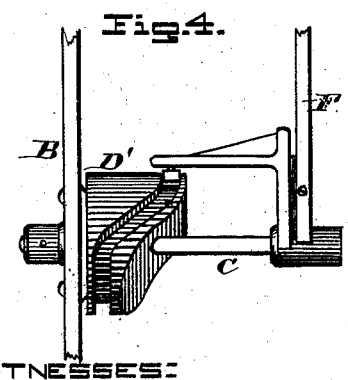
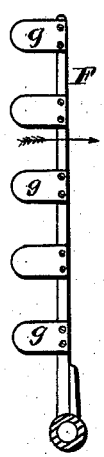
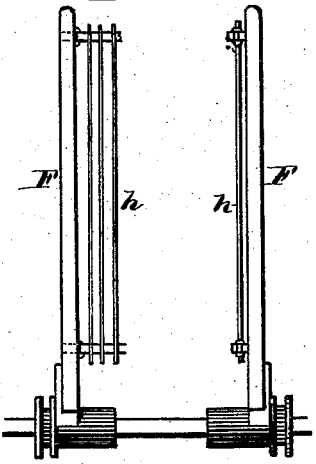
WITNESSES:
INVENTOR:
PER
ATTORNEY.

UNITED STATES PATENT OFFICE.

WILLIAM F. WIDMAYER, OF NEW YORK, N. Y.

IMPROVEMENT IN ROTARY FLIES FOR PRINTING-PRESSES.

Specification forming part of Letters Patent No. 194,022, dated August 7, 1877; application filed January 3, 1877.

*To all whom it may concern:*

Be it known that I, WM. F. WIDMAYER, of the city, county, and State of New York, have invented certain new and useful Improvements in Rotary Flies for Printing-Presses; and I do hereby declare that the following is a full, clear, and exact description thereof, which will enable others skilled in the art to which it appertains to make and use the same.

The object of this invention is to provide a fly for printing-presses wherein movable or spreading arms or fingers are employed for depositing the sheets of paper upon a horse or other platform; and the invention consists in arms sliding upon a shaft, which, at the time they receive the sheet of paper, are nearest together, and as they descend to lay the paper upon a horse or other platform, recede from one another so as to spread the sheet upon the said horse or platform, substantially as hereinafter specified.

Figure 1:
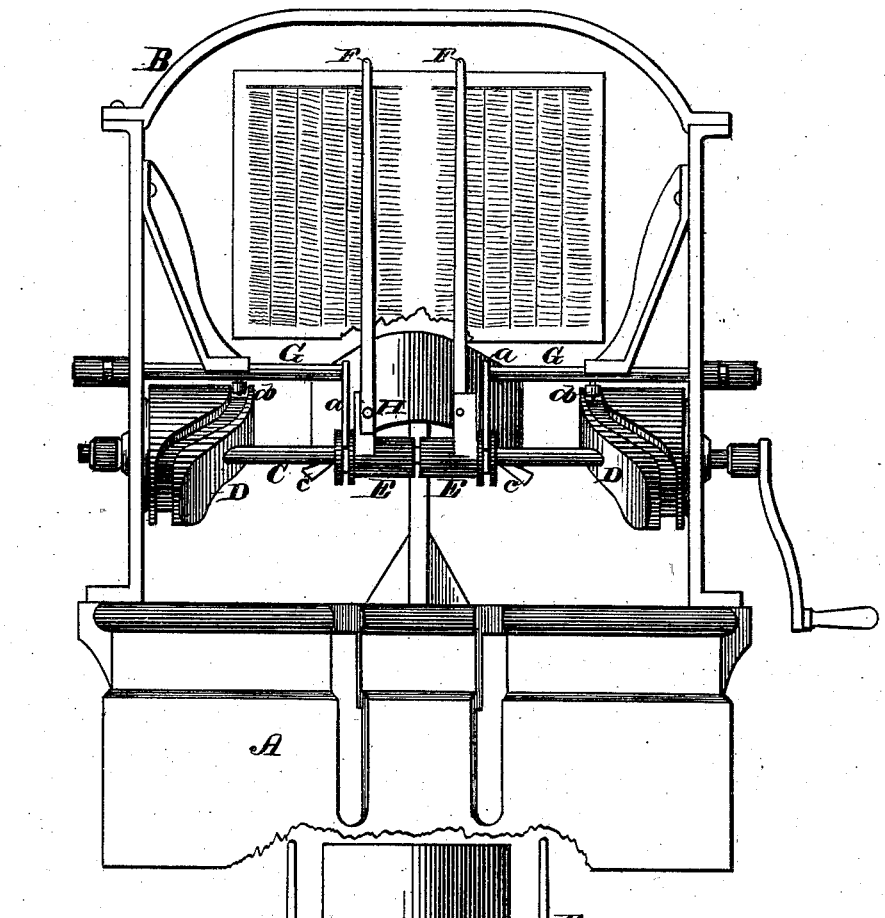
Figure 2:
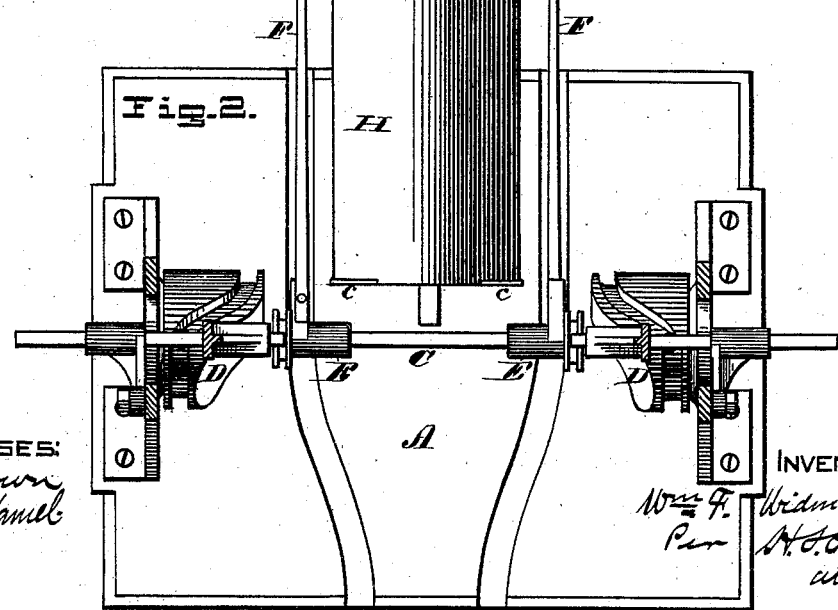

In the drawings illustrating my invention, Figure 1 is a front elevation of the device; Fig. 2, a top-plan view; Fig. 3, a side view; Fig. 4, a modification, showing a stationary cam for reciprocating the fingers. Figs. 5, 6, 7, 8, and 9 show modified forms of the fingers. Figs. 10 and 11 show a modification.

A frame, A, of suitable construction for adapting this mechanism to presses, &c., may be employed, and from it rises a vertical frame, B, in which a shaft, C, has bearings. Upon this shaft, within or outside of the frame, are keyed or otherwise secured two cams, D, with surface serpentine grooves, or of such other equivalent construction as shall adapt them to move the fly-fingers to and from one another. E E are sleeves sliding on feathers and friction-rollers upon the shaft C, to which sleeves are attached the fly fingers or arms F F. These sleeves are connected with the cams D by sliding shafts G, forked arms *a* depending from their inner ends, and embracing the said sleeves and friction-rollers *b*, which enter the grooves in the cams. The sliding shafts have suitable bearings in or upon the frame B. H is a horse for receiving the paper from the fingers. It is composed of a standard rising from the frame A, and a convex or other platform or top piece, adapted to receive and hold the sheets of paper as they are delivered by the fingers. The platform top piece or table of the horse is provided at its inner edges with ears or flanges *c c*, for preventing the sheets of paper from being drawn off the same.

This form of my mechanism is the preferred one, and I will now describe its operation, and then set forth certain modifications that may be employed.

The shaft C is rotated by suitable means, and carries around with it the cams D and the fingers F. During its revolution, the cams acting through the sliding shafts G, rollers *b*, and arms *a* upon the sleeves E, cause them, and, of course, their fingers F, to approach and recede from each other. They approach each other when the fingers stand vertically, for instance, and are just receiving the sheet of paper, and as they rotate toward the horse they are caused to recede from each other, so as to pass the horse, one on each side, thereby spreading the paper evenly upon the horse or platform, and without any tendency to draw it from the same. The shaft, continuing its revolution, again brings the fingers up ready for the next sheet.

It will be observed that the fingers receive a complete revolution—that is to say, the fly is a rotary one.

A convex horse will be found to possess many advantages over a flat platform or table.

To adapt this fly to sheets of different breadths, the cams may be fixed to the shaft by set-screws, so as to be capable of adjustment thereon, thereby limiting the throw of the sliding shafts, and in these adjustments it will be necessary to employ horses of different widths to accommodate the spread of the fingers. To accomplish the same end, the friction-rollers may be adjustable on the sliding shafts longitudinally thereof.

In Fig. 4 I have shown a cam, D', fixed to the frame B, and not revolving with shaft C. To accommodate the sleeves to such a cam, I provide said sleeves with an inverted L-shaped arm, the upper outer end of which bears the friction-roll that plays in the groove in the cam, thus dispensing with the sliding shafts. I do not wish to be understood as limiting myself here, or elsewhere, to a grooved cam, for it is obvious that any mechanism that will cause the fingers to approach and recede from one another will answer.

To remove overmuch friction of the fingers upon the paper, and to aid in spreading the paper nicely upon the horse, the fingers may be provided on their inner edges with a rod, $e$, (see Fig. 5,) upon which a number of rollers, $f$, are arranged, (shown in detail in the enlarged section, Fig. 6,) or they may have a number of flaps, $g$, Fig. 7, projecting backwardly from their inner edges, or they may be constructed with hinged gates $h$. (Shown closed in Fig. 8 and opened in Fig. 9.)

In Figs. 10 and 11 I have shown a modification of cams and sleeve, by which two sets of fly-fingers are operated instead of one set.

What I claim is—

1. In a fly for printing-presses, rotating arms or fingers approaching and receding from one another, in order to receive and spread the paper, substantially as described.

2. In a fly for printing-presses, rotary arms or fingers caused by mechanism, substantially as described, to spread or recede from each other during and at the completion of the operation of depositing the sheets of paper upon the receptacle provided for them.

3. In combination with a fly for printing-presses, a horse for receiving the paper from the fingers, constructed with a convex flanged table or top, substantially as described.

4. In a fly for printing-presses, the combination of rotary sliding arms or fingers, and cams for causing said arms to approach and recede from one another, substantially as described.

5. In a fly for printing-presses, the combination of rotary sliding arms or fingers, rotary cams, and sliding shafts, substantially as described.

6. In a fly for printing-presses, the rotary spreading arms or fingers capable of being adjusted relatively to the breadth of the sheets of paper to be acted upon, substantially as described.

In testimony that I claim the foregoing as my own I affix my signature in presence of two witnesses:

WM. F. WIDMAYER.

Witnesses:
  G. H. EBBINGHOUSEN,
  A. KUHNS.